(12) United States Patent
Tsuchiyama

(10) Patent No.: US 11,642,969 B2
(45) Date of Patent: May 9, 2023

(54) REGENERATIVE BRAKING CONTROL APPARATUS FOR ELECTRICALLY-POWERED VEHICLE

(71) Applicant: TOYOTA JIDOSHA KABUSHIKI KAISHA, Toyota (JP)

(72) Inventor: Makio Tsuchiyama, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 206 days.

(21) Appl. No.: 17/177,904

(22) Filed: Feb. 17, 2021

(65) Prior Publication Data

US 2021/0316614 A1 Oct. 14, 2021

(30) Foreign Application Priority Data

Apr. 10, 2020 (JP) .............................. JP2020-070818

(51) Int. Cl.
| | |
|---|---|
| B60L 7/16 | (2006.01) |
| B60W 10/06 | (2006.01) |
| B60W 10/196 | (2012.01) |
| B60L 7/24 | (2006.01) |
| B60W 30/18 | (2012.01) |

(Continued)

(52) U.S. Cl.
CPC .................. *B60L 7/16* (2013.01); *B60L 7/24* (2013.01); *B60W 10/06* (2013.01); *B60W 10/196* (2013.01); *B60W 10/198* (2013.01); *B60W 30/18127* (2013.01); *B60W 30/18136* (2013.01); *F02D 9/06* (2013.01); *F02D 13/04* (2013.01); *B60W 2552/40* (2020.02); *B60W 2710/06* (2013.01); *B60W 2710/08* (2013.01); *B60Y 2200/91* (2013.01); *B60Y 2200/92* (2013.01); *F02D 2009/0242* (2013.01)

(58) Field of Classification Search
CPC . B60L 7/16; B60L 7/24; B60W 10/06; B60W 10/196; B60W 10/198; B60W 30/18127; B60W 30/18136; B60W 10/18; B60W 40/068; F02D 9/06; F02D 13/04; F02D 2009/0242; B60Y 2200/91; B60Y 2200/92
USPC ..................................... 701/22; 303/150–152
See application file for complete search history.

(56) References Cited

U.S. PATENT DOCUMENTS

| | | | | |
|---|---|---|---|---|
| 5,839,533 A | * | 11/1998 | Mikami | .................... B60L 7/10 903/910 |
| 5,895,100 A | * | 4/1999 | Ito | ........................ B60T 13/586 303/3 |

(Continued)

FOREIGN PATENT DOCUMENTS

| | | |
|---|---|---|
| JP | 2005-253157 A | 9/2005 |
| JP | 2006-314178 A | 11/2006 |
| JP | 2019-092258 A | 6/2019 |

*Primary Examiner* — Sizo B Vilakazi
*Assistant Examiner* — Brian R Kirby
(74) *Attorney, Agent, or Firm* — Oliff PLC

(57) ABSTRACT

A regenerative torque control unit is configured to reduce a regenerative torque and increase a rising gradient of the regenerative torque at a start of regeneration when a road surface friction coefficient acquired by a road surface friction coefficient acquisition unit is low as compared to when the road surface friction coefficient is high. Thus, it is possible to suppress occurrence of a slip on a low μ road, and it is less likely to provide a feeling of strangeness from a change between a low μ road and a high μ road.

6 Claims, 4 Drawing Sheets

(51) Int. Cl.
*B60W 10/198* (2012.01)
*F02D 13/04* (2006.01)
*F02D 9/06* (2006.01)
*F02D 9/02* (2006.01)

(56) References Cited

U.S. PATENT DOCUMENTS

| | | | | |
|---|---|---|---|---|
| 5,915,801 | A * | 6/1999 | Taga | B60L 7/18 |
| | | | | 903/945 |
| 6,033,041 | A * | 3/2000 | Koga | B60L 7/18 |
| | | | | 303/192 |
| 6,161,641 | A * | 12/2000 | Fukumura | B60K 28/16 |
| | | | | 180/197 |
| 6,231,134 | B1 * | 5/2001 | Fukasawa | B60T 13/586 |
| | | | | 303/3 |
| 6,459,980 | B1 * | 10/2002 | Tabata | B60L 50/61 |
| | | | | 180/65.245 |
| 6,484,832 | B1 * | 11/2002 | Morisawa | B60K 6/52 |
| | | | | 903/917 |
| 6,549,840 | B1 * | 4/2003 | Mikami | B60K 6/365 |
| | | | | 903/910 |
| 6,954,045 | B2 * | 10/2005 | Nishikawa | B60K 6/387 |
| | | | | 180/65.225 |
| 6,988,779 | B2 * | 1/2006 | Amanuma | B60K 6/52 |
| | | | | 180/65.225 |
| 7,216,943 | B2 * | 5/2007 | Nishikawa | B60W 10/08 |
| | | | | 318/63 |
| 2002/0013194 | A1 * | 1/2002 | Kitano | B60L 3/102 |
| | | | | 477/3 |
| 2002/0163250 | A1 * | 11/2002 | Huls | B60L 50/61 |
| | | | | 188/158 |
| 2002/0167221 | A1 * | 11/2002 | Kosik | B60W 20/13 |
| | | | | 903/947 |
| 2003/0062770 | A1 * | 4/2003 | Sasaki | B60T 13/662 |
| | | | | 303/152 |
| 2005/0099146 | A1 * | 5/2005 | Nishikawa | B60L 7/18 |
| | | | | 318/63 |
| 2005/0234626 | A1 * | 10/2005 | Shiiba | B60W 40/09 |
| | | | | 701/72 |
| 2006/0220453 | A1 * | 10/2006 | Saito | B60W 10/184 |
| | | | | 303/152 |
| 2007/0018499 | A1 * | 1/2007 | Kokubo | B60L 7/14 |
| | | | | 303/151 |
| 2007/0038340 | A1 * | 2/2007 | Sekiguchi | B60L 50/60 |
| | | | | 701/22 |
| 2010/0127562 | A1 * | 5/2010 | Yokoyama | B60T 1/10 |
| | | | | 303/151 |
| 2014/0375115 | A1 * | 12/2014 | Ajiro | B60T 1/10 |
| | | | | 303/152 |
| 2016/0257288 | A1 * | 9/2016 | Miller | B60W 30/18109 |

* cited by examiner

REGENERATIVE BRAKING CONTROL APPARATUS FOR ELECTRICALLY-POWERED VEHICLE

CROSS-REFERENCE TO RELATED APPLICATION

This application claims priority to Japanese Patent Application No. 2020-070818 filed on Apr. 10, 2020, incorporated herein by reference in its entirety.

BACKGROUND

1. Technical Field

The disclosure relates to a regenerative braking control apparatus for an electrically-powered vehicle.

2. Description of Related Art

Japanese Unexamined Patent Application Publication No. 2005-253157 (JP 2005-253157 A) describes a regenerative braking control apparatus that performs braking by driving a generator using the rotational energy of wheels. The regenerative braking control apparatus changes the rising gradient of a deceleration at the start of regenerative braking in accordance with a road surface friction coefficient estimated by a road surface friction coefficient estimator. On a road surface of which the road surface friction coefficient is low (low μ road), a deceleration at a braking initial stage is slowly increased by reducing the rising gradient of a deceleration at the start of regenerative braking. With this configuration, occurrence of a slip at a low deceleration as a result of a rapid increase in braking torque is suppressed, and occurrence of a slip is prevented until a relatively high deceleration is achieved.

SUMMARY

Since the regenerative braking control apparatus described in JP 2005-253157 A reduces the rising gradient of a deceleration at the start of regenerative braking on a low μ road, the regenerative braking control apparatus is capable of suppressing occurrence of a slip. However, a deceleration feel of a driver reduces as compared to that during regenerative braking on a road surface of which the road surface friction coefficient is high (high μ road), and, therefore, a driver may experience a feeling of strangeness.

The disclosure provides a regenerative braking control apparatus for an electrically-powered vehicle, which is capable of suppressing occurrence of a slip on a low μ road and less likely to provide a feeling of strangeness from a change in deceleration feel between a low μ road and a high μ road.

A regenerative braking control apparatus for an electrically-powered vehicle according to the disclosure is a regenerative braking control apparatus for an electrically-powered vehicle including a rotating electrical machine for driving the vehicle, and includes a road surface friction coefficient acquisition unit configured to acquire a road surface friction coefficient and a regenerative torque control unit configured to control a regenerative torque of the rotating electrical machine during deceleration of the electrically-powered vehicle. The regenerative torque control unit is configured to reduce the regenerative torque and increase a rising gradient of the regenerative torque at a start of regeneration when the road surface friction coefficient acquired by the road surface friction coefficient acquisition unit is low as compared to when the road surface friction coefficient is high.

With this configuration, the regenerative torque control unit is configured to reduce the regenerative torque and increase a rising gradient of the regenerative torque at a start of regeneration when the road surface friction coefficient acquired by the road surface friction coefficient acquisition unit is low as compared to when the road surface friction coefficient is high. Since the regenerative torque during deceleration reduces when the road surface friction coefficient is low (low μ road) as compared to when the road surface friction coefficient is high (high μ road), it is possible to suppress occurrence of a slip on a low μ road. Since, on a low μ road, the rising gradient of the regenerative torque at a start of regeneration is increased even when the regenerative torque during deceleration is reduced, the rise of deceleration of the electrically-powered vehicle becomes quick, so it is possible to increase a deceleration feel of a driver, and it is possible to suppress a change in deceleration feel between a low μ road and a high μ road, with the result that it is less likely to provide a feeling of strangeness.

The regenerative torque control unit may be configured to control the rising gradient of the regenerative torque and a magnitude of the regenerative torque such that a maximum value of deceleration of the electrically-powered vehicle, caused by the regenerative torque, is equal between when the road surface friction coefficient is low and when the road surface friction coefficient is high.

With this configuration, since the rising gradient of the regenerative torque and the magnitude of the regenerative torque are controlled such that the maximum value of deceleration of the electrically-powered vehicle, caused by the regenerative torque, is equal between when the road surface friction coefficient is low and when the road surface friction coefficient is high, so it is possible to further suppress a change in the deceleration feel of a driver between a low μ road and a high μ road.

The electrically-powered vehicle may be a hybrid vehicle including an internal combustion engine. The electrically-powered vehicle may be configured to, during deceleration in a predetermined state, decelerate by using a braking force caused by resistance of the internal combustion engine without performing regeneration using the rotating electrical machine during deceleration of the electrically-powered vehicle. The regenerative torque control unit may be configured to control the rising gradient of the regenerative torque and a magnitude of the regenerative torque such that a maximum value of deceleration of the electrically-powered vehicle, caused by the regenerative torque, becomes a maximum value of deceleration of the electrically-powered vehicle in a case where regeneration using the rotating electrical machine is not performed.

With this configuration, the electrically-powered vehicle that is a hybrid vehicle decelerates by using a braking force caused by resistance of the internal combustion engine (engine brake) when the electrically-powered vehicle does not perform regeneration using the rotating electrical machine during deceleration. The rising gradient of the regenerative torque and the magnitude of the regenerative torque are controlled such that the maximum value of deceleration of the electrically-powered vehicle, caused by the regenerative torque, becomes the maximum value of deceleration caused by engine brake regardless of a road surface friction coefficient. Therefore, it is possible to further suppress a change in the deceleration feel of a driver between a low μ road and a high μ road, and it is also possible to suppress a difference from a deceleration feel in the case where no deceleration caused by the regenerative torque is performed.

The road surface friction coefficient acquisition unit may be configured to estimate that the road surface friction coefficient is low when an outside air temperature is low. When, for example, an outside air temperature is low to such an extent that a road surface freezes, the road surface friction coefficient acquisition unit estimates that the road surface friction coefficient is low (low µ road).

With this configuration, it is possible to relatively easily acquire a road surface friction coefficient. The electrically-powered vehicle may be rear-wheel drive.

During deceleration of a vehicle, generally, a front wheel load increases, but a rear wheel load reduces. For this reason, when the electrically-powered vehicle is rear-wheel drive, rear wheels tend to easily lock through deceleration caused by a regenerative torque. However, when the above-described configurations are applied to a rear-wheel-drive electrically-powered vehicle, it is possible to suitably suppress locking of the rear wheels due to a regenerative torque.

According to the disclosure, it is possible to provide a regenerative braking control apparatus for an electrically-powered vehicle, which is capable of suppressing occurrence of a slip on a low µ road and less likely to provide a feeling of strangeness from a change in deceleration feel between a low µ road and a high µ road.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
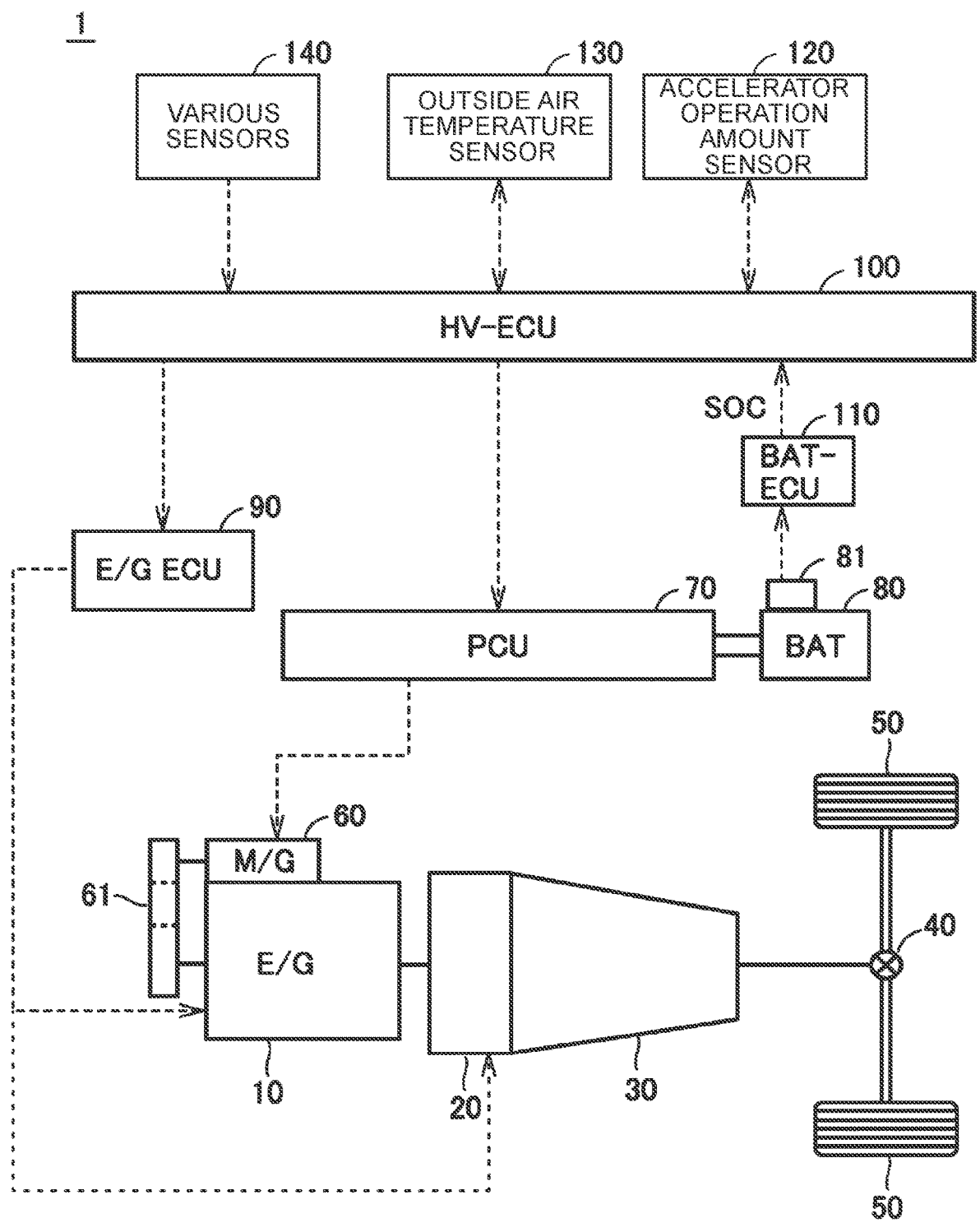
FIG. 1 is an overall configuration diagram of an electrically-powered vehicle including a regenerative braking control apparatus according to an embodiment.

Hereinafter, an embodiment of the disclosure will be described in detail with reference to the accompanying drawings. Like reference signs denote the same or corresponding portions in the drawings, and the description thereof will not be repeated.

FIG. 1 is a diagram showing an overall configuration of an electrically-powered vehicle 1 including a braking control apparatus according to the present embodiment. The electrically-powered vehicle 1 is a hybrid vehicle including an internal combustion engine 10. The electrically-powered vehicle 1 includes the internal combustion engine 10, a torque converter 20, and an automatic transmission 30.

The internal combustion engine 10 is, for example, a spark-ignition internal combustion engine or a compression-ignition internal combustion engine. The output shaft of the internal combustion engine 10 is connected to the input shaft of the torque converter 20. The torque converter 20 is a torque converter equipped with a lockup clutch. The torque converter 20 includes a pump impeller, a turbine runner, a stator, and a lockup clutch (not shown). Torque amplification is performed between the pump impeller connected to the input shaft of the torque converter 20 and the turbine runner connected to the output shaft of the torque converter 20, and the output of the internal combustion engine 10 is transmitted to the automatic transmission 30. The lockup clutch (not shown) of the torque converter 20 is controlled to any one of an engaged state, a released state, and a slip (half-engaged) state. When the lockup clutch is in the engaged state, the input shaft and output shaft of the torque converter 20 are directly coupled, and the input shaft and the output shaft integrally rotate.

The output shaft of the torque converter 20 is connected to the input shaft of the automatic transmission 30. The automatic transmission 30 is a planetary gear multi-speed automatic transmission. The automatic transmission 30 establishes each shift stage by controlling a combination of engagement and release of a plurality of friction engagement elements. The output shaft of the automatic transmission 30 is connected to a differential gear 40 via a propeller shaft. The differential gear 40 is connected to rear wheels 50 that are drive wheels via drive shafts. The electrically-powered vehicle 1 is a rear-wheel-drive vehicle that transmits an output torque (drive torque) output from the internal combustion engine 10 to the rear wheels 50 via the torque converter 20, the automatic transmission 30, and the differential gear 40.

The electrically-powered vehicle 1 includes a motor generator (hereinafter, referred to as MG) 60. The MG 60 is a rotating electrical machine and is, for example, an interior permanent magnet (IPM) synchronous motor in which permanent magnets are embedded in a rotor. The output shaft (rotor shaft) of the MG 60 is connected to the crankshaft of the internal combustion engine 10 via a belt 61. When the MG 60 operates as an electric motor, the output torque of the MG 60 drives the rear wheels 50 that are drive wheels via the crankshaft of the internal combustion engine 10. When the MG 60 is driven via the crankshaft of the internal combustion engine 10, the MG 60 operates as a generator.

A power control unit (PCU) 70 converts direct-current power received from an electrical storage device 80 to alternating-current power for driving the MG 60. The PCU 70 converts alternating-current power generated by the MG 60 to direct-current power for charging the electrical storage device 80. The PCU 70 includes, for example, an inverter and a converter. The converter steps up a direct-current voltage, supplied to the inverter, to a voltage higher than or equal to the voltage of the electrical storage device 80.

The electrical storage device 80 is a rechargeable direct-current power supply and includes, for example, a secondary battery, such as a lithium ion battery and a nickel-metal hydride battery. For example, a 48V lithium ion battery may be used as the electrical storage device 80. The electrical storage device 80 is charged by receiving electric power generated by the MG 60. The electrical storage device 80 supplies the stored electric power to the PCU 70, and the MG 60 is driven.

A monitoring unit 81 is provided for the electrical storage device 80. The monitoring unit 81 includes a voltage sensor, a current sensor, and a temperature sensor (any of which is not shown) that respectively detect the voltage, input/output current, and temperature of the electrical storage device 80. The monitoring unit 81 outputs detected values (the voltage, input/output current, and temperature of the electrical storage device 80) of the sensors to a BAT-ECU 110.

The electrically-powered vehicle 1 includes an E/G-ECU (electronic control unit) 90, an HV-ECU 100, a BAT-ECU 110, an accelerator operation amount sensor 120, an outside air temperature sensor 130, and various sensors 140. Each ECU includes a central processing unit (CPU), memory, and input/output buffer (not shown), receives signals from various sensors and the like, outputs control signals to the devices, and controls the devices.

The BAT-ECU 110 calculates a state of charge (SOC) of the electrical storage device 80 based on detected values of the sensors, output from the monitoring unit 81, and outputs the SOC to the HV-ECU 100. The HV-ECU 100 outputs commands for controlling the internal combustion engine 10 and the torque converter 20 to the E/G-ECU 90 and outputs a command for controlling the MG 60 to the PCU 70. The HV-ECU 100 may be regarded as "regenerative braking control apparatus" in the disclosure.

The E/G-ECU 90 controls the output power of the internal combustion engine 10 and controls the engaged state (slip state) of the lockup clutch of the torque converter 20 based on commands from the HV-ECU 100. When the PCU 70 is controlled in accordance with the command from the HV-ECU 100, the MG 60 is controlled to a powering state (driving state) or a regenerative state (power generation state).

The accelerator operation amount sensor 120 detects the depression amount of an accelerator pedal. Instead of the accelerator operation amount sensor 120, a throttle opening degree sensor that detects the throttle opening degree of the internal combustion engine 10 may be employed. The outside air temperature sensor 130 detects an outside air temperature around the electrically-powered vehicle 1. The various sensors 140 include a vehicle speed sensor that detects a vehicle speed, a brake sensor that detects the depression amount of a brake pedal, and the like.

Figure 2:
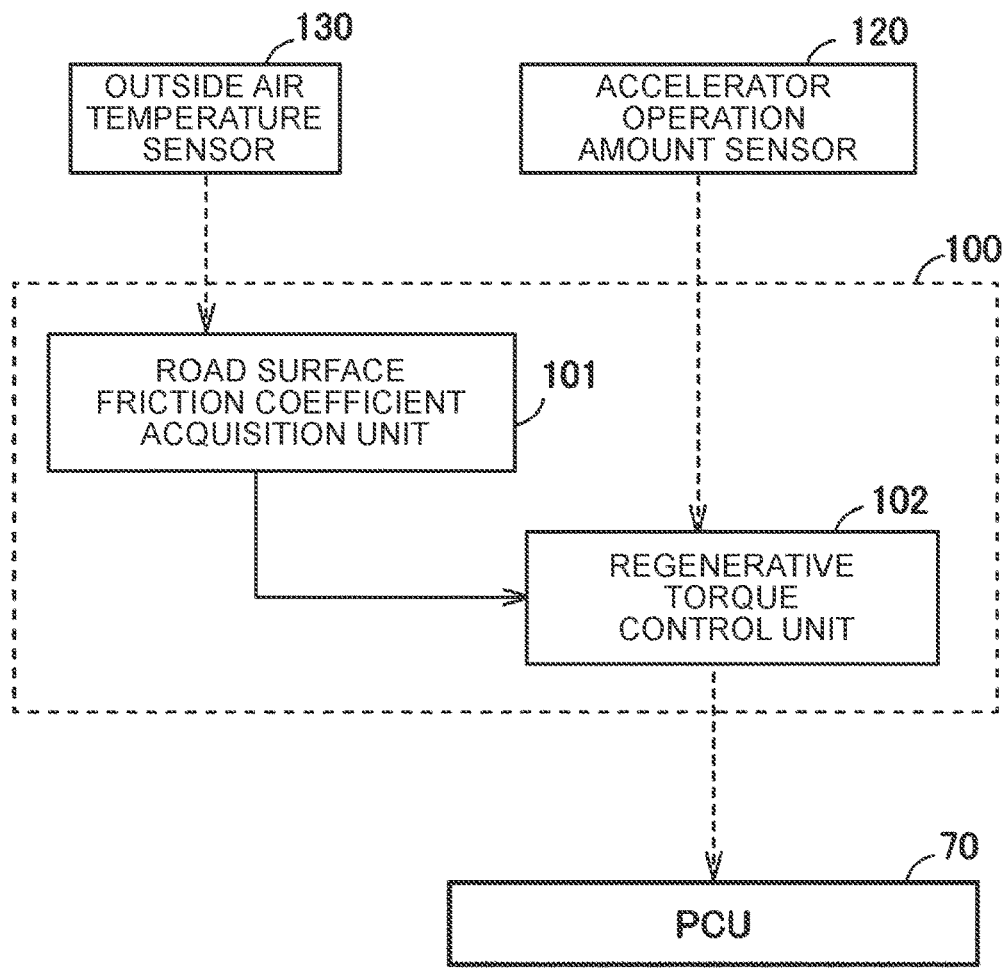
FIG. 2 is a functional block diagram of an HV-ECU in the present embodiment.

FIG. 2 is a functional block diagram of the HV-ECU 100 in the present embodiment. The HV-ECU 100 includes a road surface friction coefficient acquisition unit 101 and a regenerative torque control unit 102. These components may be implemented by software processing or may be implemented by hardware (electric circuit).

The road surface friction coefficient acquisition unit 101 estimates a road surface friction coefficient (road surface $\mu$) based on an outside air temperature detected by the outside air temperature sensor 130 and acquires the estimated road surface friction coefficient. Specifically, the road surface friction coefficient acquisition unit 101 estimates that the road surface friction coefficient is low (low $\mu$ road) when the outside air temperature is low to such an extent that a road surface freezes (when, for example, the outside air temperature is lower than or equal to 2° C.). The road surface friction coefficient acquisition unit 101 estimates that the road surface friction coefficient is high (high $\mu$ road) when the outside air temperature is not low to such an extent that the road surface freezes (when, for example, the outside air temperature exceeds 2° C.).

Figure 3:
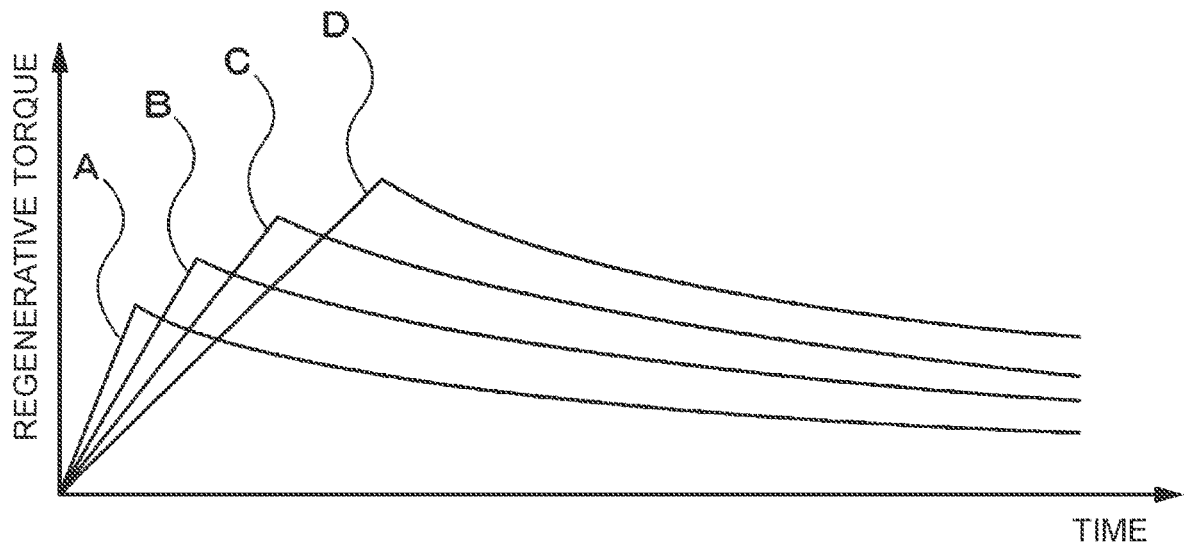
FIG. 3 is a view showing a map for calculating a regenerative torque of an MG.

The regenerative torque control unit 102 determines that the electrically-powered vehicle 1 is decelerating when, during travel of the vehicle, (when, for example, the vehicle speed is higher than or equal to a predetermined value), an accelerator operation amount detected by the accelerator operation amount sensor 120 is zero, that is, the accelerator pedal is not depressed, and calculates the regenerative torque of the MG 60. FIG. 3 is a map for calculating the regenerative torque of the MG 60. The regenerative torque control unit 102 calculates the regenerative torque of the MG 60 based on the map of FIG. 3.

In FIG. 3, the ordinate axis represents the magnitude of regenerative torque, and the abscissa axis represents a time from the start of regeneration (the start of deceleration). In FIG. 3, "A" represents a regenerative torque A on a low $\mu$ road, and "D" represents a regenerative torque D on a high $\mu$ road. In the regenerative torque A on a low $\mu$ road, a rising gradient at the start of regeneration is greater than a rising gradient at the start of regeneration of the regenerative torque D on a high $\mu$ road. The regenerative torque A on a low $\mu$ road is less in magnitude than the regenerative torque D on a high $\mu$, road. The regenerative torque calculated by the regenerative torque control unit 102 is output to the PCU 70 as a command value. The PCU 70 drives the MG 60 such that the regenerative torque of the MG 60 coincides with the command value.

Figure 4:
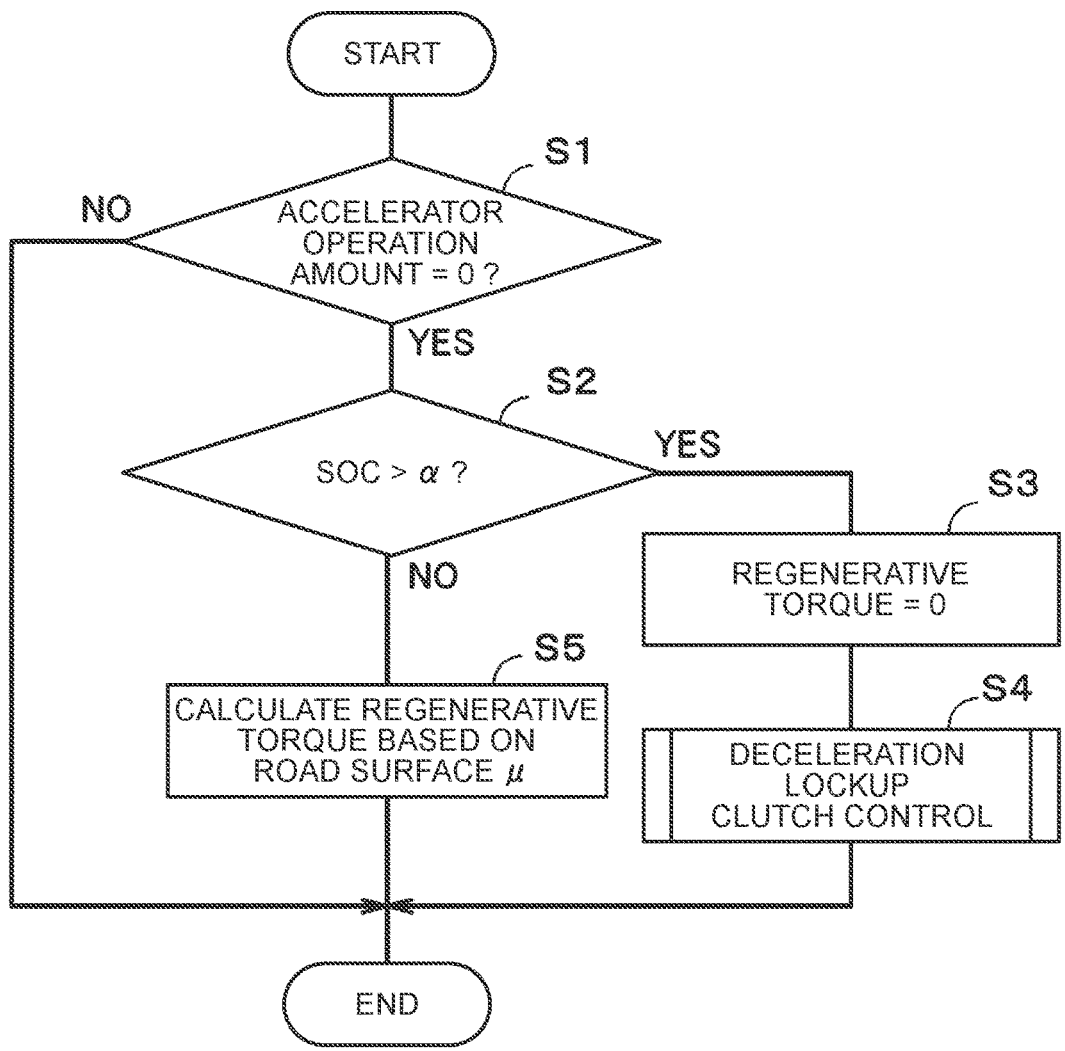
FIG. 4 is a flowchart showing a procedure to be processed by a regenerative torque control unit of the HV-ECU.

FIG. 4 is a flowchart showing a procedure to be processed by the regenerative torque control unit 102 of the HV-ECU 100. The flowchart shown in FIG. 4 is repeatedly executed at predetermined intervals during travel of the electrically-powered vehicle 1 (when, for example, the vehicle speed is higher than or equal to a predetermined value). Initially, step (hereinafter, step is abbreviated as "S") 1, it is determined whether the accelerator operation amount is zero. When the accelerator operation amount is not zero, the determination is negative, and the current process is ended. When the accelerator operation amount is not zero, the electrically-powered vehicle 1 is not decelerating, so the MG 60 is driven in accordance with the travel status of the electrically-powered vehicle 1, the output torque of the MG 60 is added to the output torque of the internal combustion engine 10, and the rear wheels 50 that are drive wheels are driven.

When the accelerator operation amount becomes zero, it is determined that the electrically-powered vehicle 1 starts decelerating, the determination is affirmative in S1, and the process proceeds to S2. In S2, it is determined whether regeneration using the MG 60 is possible. Specifically, it is determined whether the SOC of the electrical storage device 80 exceeds a predetermined value $\alpha$. When the SOC of the electrical storage device 80 exceeds the predetermined value $\alpha$, the electrical storage device 80 may be overcharged if charged, so it is determined that it is difficult to perform regeneration using the MG 60. When it is determined in S2 that the SOC of the electrical storage device 80 exceeds the predetermined value $\alpha$, the process proceeds to S3. The state where the determination is affirmative in S2 corresponds to "predetermined state" in the disclosure. When the temperature of the electrical storage device 80 exceeds an upper limit or when the temperature of the MG 60 exceeds an upper limit, the determination may be affirmative in S2 (it may be determined that regeneration using the MG 60 is difficult).

Figure 5:
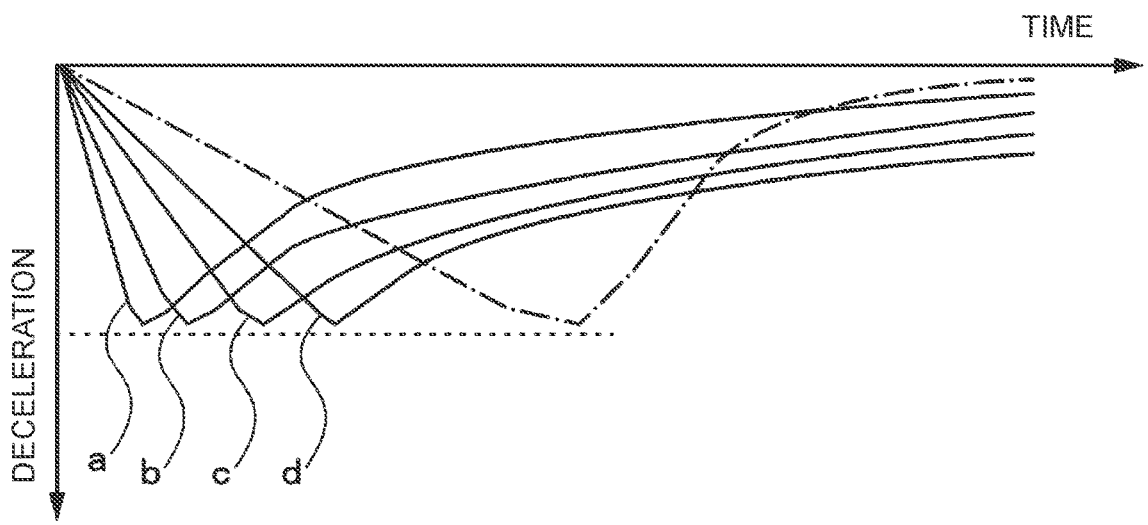
FIG. 5 is a map showing a deceleration during deceleration of the electrically-powered vehicle.

In S3, the regenerative torque of the MG 60 is set to zero, and the process proceeds to S4. In S4, the lockup clutch of the torque converter 20 is controlled by executing deceleration lockup clutch control. In the present embodiment, deceleration lockup clutch control is to improve fuel efficiency by setting the lockup clutch in a directly coupled state at the initial stage of deceleration to activate engine brake and maintaining a high rotation speed of the internal combustion engine 10 to expand a fuel cut region during deceleration. FIG. 5 is a map showing a deceleration during deceleration of the electrically-powered vehicle 1 (during coasting at an accelerator operation amount of zero). In FIG. 5, the ordinate axis represents the deceleration of the electrically-powered vehicle 1, and the abscissa axis represents time. The alternate long and short dashed line represents the deceleration of the electrically-powered vehicle 1 at the time when deceleration lockup clutch control is executed at a regenerative torque of zero. In other words, the alternate long and short dashed line represents a deceleration during deceleration using only engine brake. When the electrically-powered vehicle 1 starts decelerating, engine brake is activated as a result of direct coupling of the lockup clutch, with the result that the deceleration increases. After that, the level of engine brake is reduced as a result of start of slip control of the lockup clutch, so the deceleration of the electrically-powered vehicle 1 reduces.

When the SOC of the electrical storage device 80 is lower than or equal to the predetermined value α in S2, it is determined that regeneration using the MG 60 is possible (the determination is negative in S2), and the process proceeds to S5. In S5, the regenerative torque of the MG 60 is calculated based on the road surface friction coefficient acquired (estimated) by the road surface friction coefficient acquisition unit 101. Specifically, when the outside air temperature is low to such an extent that a road surface freezes and the road is a low μ road, the regenerative torque A is calculated from the map shown in FIG. 3; whereas, when the outside air temperature is not so low to such an extent that a road surface freezes and the road is a high μ road, the regenerative torque D is calculated from the map shown in FIG. 3. Then, the calculated regenerative torque is output to the PCU 70 as a command value, and the process ends.

During deceleration of the electrically-powered vehicle 1, a front wheel load increases, but a rear wheel load reduces. For this reason, in the rear-wheel-drive electrically-powered vehicle 1, the rear wheels 50 tend to easily lock by a braking force caused by the regenerative torque of the MG 60. Particularly, on a low μ road of which the road surface friction coefficient is low, the rear wheels 50 further easily lock. For this reason, on a low μ road, it is desirable to suppress locking of the rear wheels 50 by reducing the regenerative torque of the MG 60. However, when the regenerative torque of the MG 60 reduces, a braking force reduces, and a deceleration feel of a driver also reduces.

In the present embodiment, the regenerative torque of the MG 60, calculated in S5, is obtained from the map of FIG. 3. In the case of a low μ road of which the road surface friction coefficient is low, the regenerative torque A is calculated; whereas, in the case of a high μ road of which the road surface friction coefficient is high, the regenerative torque D is calculated. The rising gradient of the regenerative torque A on a low μ road at the start of regeneration (at the start of deceleration) is set so as to be greater than the rising gradient of the regenerative torque D on a high μ road. The regenerative torque A on a low μ road is set so as to be less in magnitude than the regenerative torque D on a high μ road. Since the regenerative torque A is small, a braking force on a low μ road reduces, so it is possible to suppress locking of the rear wheels 50 on a low μ road.

In FIG. 5, the continuous line a represents the deceleration a of the electrically-powered vehicle 1 at the regenerative torque A, and the continuous line d represents the deceleration d of the electrically-powered vehicle 1 at the regenerative torque D. The regenerative torque A is less than the regenerative torque D, but the rising gradient of the regenerative torque A at the start of regeneration is greater than the rising gradient of the regenerative torque D. As shown in FIG. 5, the rise of the deceleration a becomes faster than the rise of the deceleration d, a deceleration feel of a driver increases even when the regenerative torque A is small, and it is possible to suppress a change in deceleration feel between a low μ road and a high μ road, so it is less likely to provide a feeling of strangeness.

As shown in FIG. 5, the maximum value (peak value) of the deceleration a and the maximum value (peak value) of the deceleration d are substantially the same value. This is achieved by performing experiments and/or simulations such that, based on the regenerative torque D and the deceleration d on a high μ road, the maximum value (peak value) of the deceleration a and the maximum value (peak value) of the deceleration d coincide with each other during deceleration using the regenerative torque A, and setting the rising gradient and magnitude of the regenerative torque A. Thus, the maximum value (peak value) of the deceleration of the electrically-powered vehicle 1, caused by the regenerative torque of the MG 60, is equal between high μ road and low μ road, so it is possible to further suppress a change in deceleration feel of a driver.

As shown in FIG. 5, the maximum value (peak value) of the deceleration a and the maximum value (peak value) of the deceleration d are substantially the same value as the maximum value (peak value) of deceleration using only engine brake, represented by the alternate long and short dashed line. This is achieved by performing experiments and/or simulations such that, based on the deceleration represented by the alternate long and short dashed line, the maximum value (peak value) of the deceleration a and the maximum value (peak value) of the deceleration d coincide with the maximum value (peak value) of deceleration represented by the alternate long and short dashed line, and setting the rising gradients and magnitudes of the regenerative torque A and regenerative torque D. Thus, it is also possible to suppress a gap between a deceleration feel of a driver during deceleration using only engine brake and a deceleration feel of a driver during deceleration caused by the regenerative torque of the MG 60. Therefore, it is possible to suppress a change in the deceleration feel of a driver between a low μ road and a high μ road, and it is also possible to suppress a difference from a deceleration feel in the case where no deceleration caused by the regenerative torque of the MG 60 is performed.

In the present embodiment, as shown in FIG. 3, the regenerative torque A and the regenerative torque D are set so as to increase at a predetermined rising gradient after the start of regeneration and then gradually reduce. Therefore, a braking force decreases from the middle of deceleration as in the case of deceleration using only engine brake, and it is possible to reduce the percentage at which braking force balance between the front wheels and the rear wheels varies depending on whether the MG 60 is performing regeneration.

Modification

In the above-described embodiment, the road surface friction coefficient acquisition unit 101 estimates a road surface friction coefficient (road surface μ) based on the outside air temperature detected by the outside air temperature sensor 130, and acquires whether the road is a low μ road or a high μ road, so the road surface friction coefficient acquisition unit 101 relatively simply estimates a road surface friction coefficient. However, a method of acquiring a road surface friction coefficient with the road surface friction coefficient acquisition unit 101 is not limited thereto. For example, the friction coefficient of a road surface and a road surface condition (dry, wet, frozen, or the like) may be detected by applying infrared laser having a plurality of wavelengths and measuring the reflection. Thus, the road surface friction coefficient may be acquired. Alternatively, a slip ratio during acceleration may be obtained from the vehicle body speed of the electrically-powered vehicle 1 and the wheel speeds of the rear wheels 50 (drive wheels), and a road surface friction coefficient may be estimated based on the slip ratio and a maximum value of an acceleration.

When a road surface friction coefficient is acquired by such methods, it is possible to acquire the road surface friction coefficients of roads other than a low μ road and a high μ road. Therefore, as shown in FIG. 3, it is possible to set a regenerative torque B and a regenerative torque C other than the regenerative torque A on a low μ road and the regenerative torque D on a high μ road. Thus, it is possible to further minutely control regenerative torque. The magnitude relation in road surface friction coefficient is that regenerative torque A<regenerative torque B<regenerative torque C<regenerative torque D. As shown in FIG. 5, the regenerative torque B and the regenerative torque C are set such that the maximum value (peak value) of deceleration b caused by the regenerative torque B and the maximum value (peak value) of deceleration c caused by the regenerative torque C are also substantially equal to the maximum values (peak values) of the other decelerations.

Figure 6:
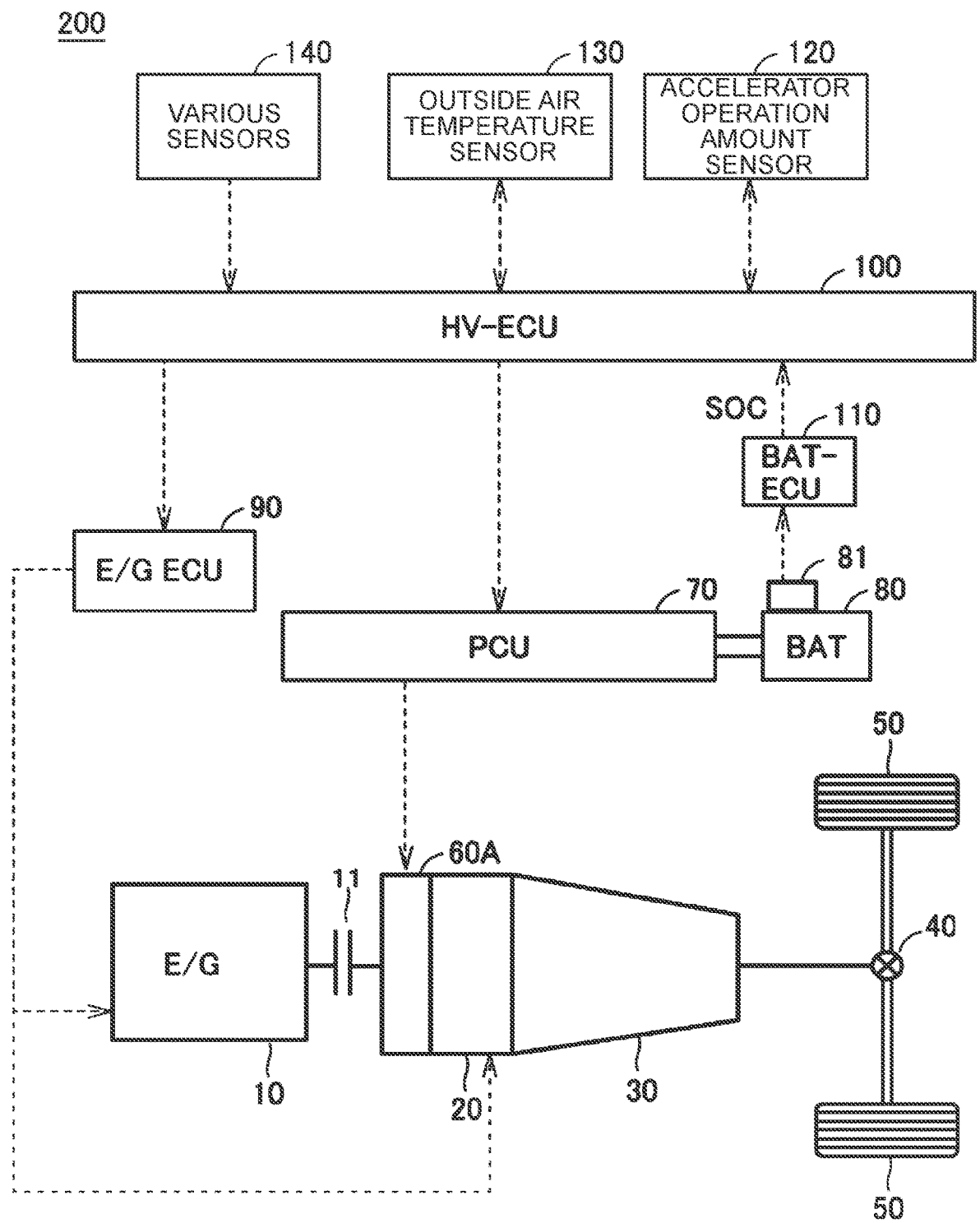
FIG. 6 is a diagram illustrating an electrically-powered vehicle in a modification.

In the above-described embodiment, the hybrid vehicle (electrically-powered vehicle 1) in which the output shaft of the MG 60 is connected to the crankshaft of the internal combustion engine 10 via the belt 61 is described. Alternatively, an electrically-powered vehicle 200 configured as shown in FIG. 6 may also be employed. In the electrically-powered vehicle 200, an MG 60A is provided on the input shaft of the torque converter 20. In other words, the rotor shaft of the MG 60A is connected to the input shaft of the torque converter 20. The MG 60A and the internal combustion engine 10 are connected via a clutch 11. The other components are similar to those of the electrically-powered vehicle 1.

When the clutch 11 is released, the electrically-powered vehicle 200 is capable of traveling by using only the output of the MG 60A without using the power of the internal combustion engine 10 (EV drive mode). In addition, when the clutch 11 is released, the electrically-powered vehicle 200 is capable of decelerating by using only the regenerative torque of the MG 60A without using engine brake.

In the above-described embodiment, the hybrid vehicle is described as the electrically-powered vehicle 1. Alternatively, an electrically-powered vehicle may be an electric automobile including no internal combustion engine. In this case, it is difficult to obtain the deceleration represented by the alternate long and short dashed line shown in FIG. 5; however, the regenerative torques A, B, C, and D are set such that the maximum values (peak values) of the decelerations a, b, c, and d for the regenerative torques A, B, C, and D are substantially equal to one another.

In the above-described embodiment, the electrically-powered vehicle 1 is a rear-wheel-drive vehicle. Alternatively, the electrically-powered vehicle 1 may be a front-wheel-drive vehicle or an all-wheel-drive vehicle.

The embodiment described above is illustrative and not restrictive in all respects. The scope of the disclosure is not defined by the description of the above-described embodiment, and is defined by the appended claims. The scope of the disclosure is intended to encompass all modifications within the scope of the appended claims and equivalents thereof.

What is claimed is:

1. A regenerative braking control apparatus for an electrically-powered vehicle including a rotating electrical machine for driving the vehicle, the regenerative braking control apparatus comprising:
   a road surface friction coefficient acquisition unit programmed to acquire a road surface friction coefficient; and
   a regenerative torque control unit programmed to control a regenerative torque of the rotating electrical machine during deceleration of the electrically-powered vehicle, wherein:
   the regenerative torque control unit is programmed to control the regenerative torque for a rear wheel of the electrically-powered vehicle, wherein the electrically-powered vehicle is a rear-wheel-drive vehicle; and
   the regenerative torque control unit is programmed to reduce the regenerative torque and increase a rising gradient of the regenerative torque over time at a start of regeneration when the road surface friction coefficient acquired by the road surface friction coefficient acquisition unit is low as compared to when the road surface friction coefficient is high.

2. The regenerative braking control apparatus according to claim 1, wherein the regenerative torque control unit is programmed to control the rising gradient of the regenerative torque and a magnitude of the regenerative torque such that a maximum value of deceleration of the electrically-powered vehicle, caused by the regenerative torque, is equal between when the road surface friction coefficient is low and when the road surface friction coefficient is high.

3. The regenerative braking control apparatus according to claim 1, wherein:
   the electrically-powered vehicle is a hybrid vehicle including an internal combustion engine;
   the electrically-powered vehicle is programmed to, during deceleration in a predetermined state, decelerate by using a braking force caused by resistance of the internal combustion engine without performing regeneration using the rotating electrical machine during deceleration of the electrically-powered vehicle; and
   the regenerative torque control unit is programmed to control the rising gradient of the regenerative torque and a magnitude of the regenerative torque such that a maximum value of deceleration of the electrically-powered vehicle, caused by the regenerative torque, is substantially the same as a maximum value of deceleration in the predetermined state using only the braking force caused by resistance of the internal combustion engine without performing regeneration using the rotating machine during deceleration of the electrically-powered vehicle.

4. The regenerative braking control apparatus according to claim 1, wherein the road surface friction coefficient acquisition unit is programmed to estimate that the road surface friction coefficient is low when an outside air temperature is low.

5. The regenerative braking control apparatus according to claim 1, wherein the regenerative torque control unit is programmed to control the regenerative torque for only rear wheels of the electrically-powered vehicle.

6. The regenerative braking control apparatus according to claim 1, wherein the electrically-powered vehicle is configured to output torque from an internal combustion engine to the rear wheel.

* * * * *